July 11, 1961 J. B. McHUGH 2,991,663
"Z" AXIS DRIVE SYSTEM
Filed Nov. 26, 1958 3 Sheets-Sheet 2

INVENTOR.
JOHN B. McHUGH
BY
Lawrence S. Epstein
ATTORNEYS

July 11, 1961 J. B. McHUGH 2,991,663
"Z" AXIS DRIVE SYSTEM

Filed Nov. 26, 1958 3 Sheets-Sheet 3

INVENTOR.
JOHN B. McHUGH
BY
Lawrence S. Epstein
ATTORNEYS

United States Patent Office 2,991,663
Patented July 11, 1961

2,991,663
"Z" AXIS DRIVE SYSTEM
John B. McHugh, Philadelphia, Pa., assignor, by mesne assignments, to the United States of America as represented by the Secretary of the Navy
Filed Nov. 26, 1958, Ser. No. 776,652
1 Claim. (Cl. 74—665)

This invention relates generally to positioning mechanisms and more particularly to a drive mechanism useable with a master terrain model system which operates to position a cutting head for said system.

This invention, while generally applicable, is preferably utilized in conjunction with the system disclosed in patent application Serial No. 774,791 filed November 18, 1958, and the elements which are the subjects of patent applications Serial Nos. 775,327 filed November 20, 1958, 775,328 filed November 20, 1958, 775,331 filed November 20, 1958, 776,650 filed November 26, 1958, 778,271 filed December 4, 1958, and Patent No. 2,876,562.

An important object of the invention is to provide a mechanism capable of accurately positioning a cutting tool.

Another object of the invention is to provide a very responsive drive mechanism.

Other objects and many of the attendant advantages of this invention will be readily appreciated as the same becomes better understood by reference to the following detailed description when considered in connection with the accompanying drawings wherein.

Figure 1:
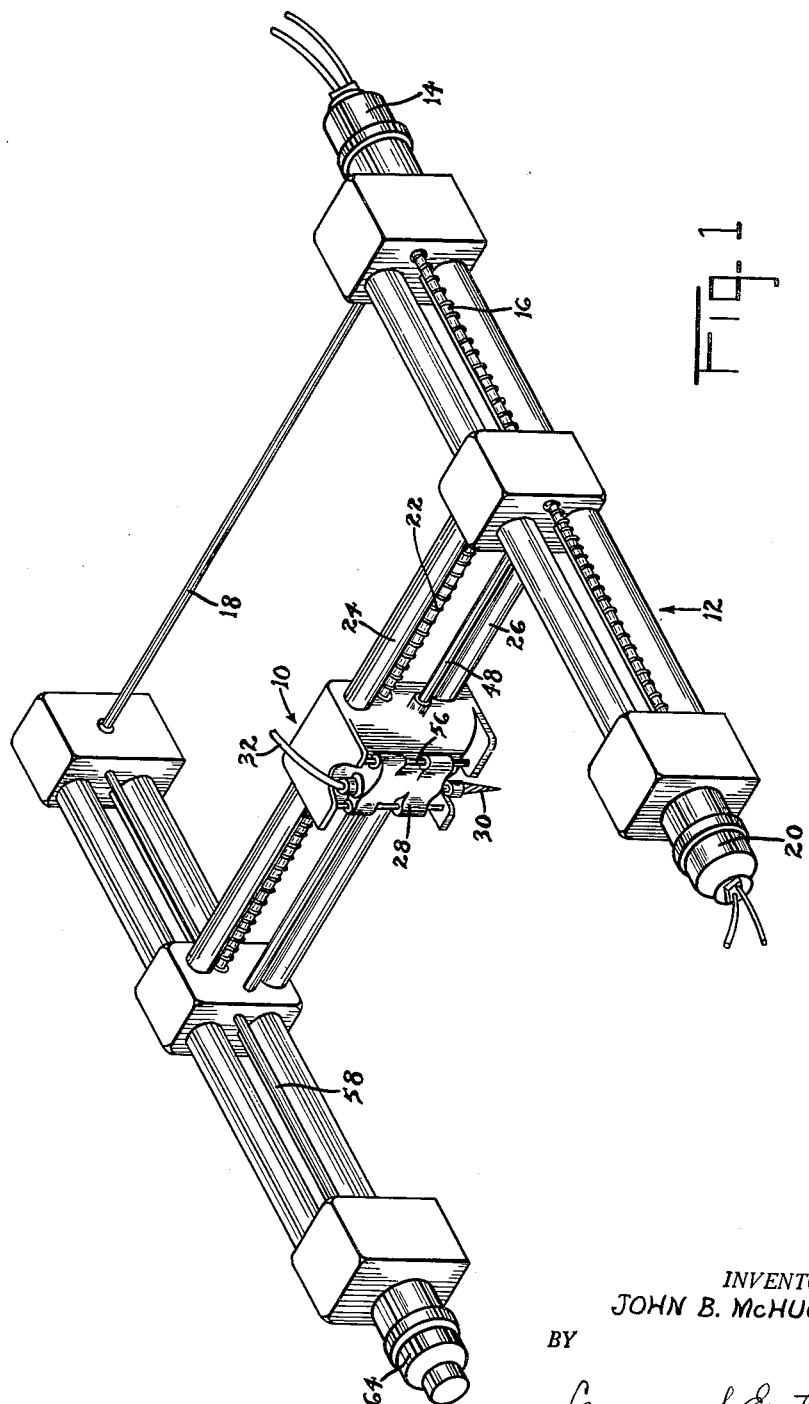
FIGURE 1 depicts the instant invention in its usual mode of operation.

Referring to FIGURE 1, the instant inventive structure 10 is shown in cooperation with the coordinate positioning system 12 which is the subject of patent application Serial No. 776,650 filed November 26, 1958. Positioning of the inventive drive mechanism 10 in an "X" direction is accomplished by drive motor 14 and lead screw 16. Also, a second lead screw is rotated through the operation of the "X" linkage 18. Positioning in a "Y" direction is accomplished by motor 20, a linkage (not shown), and lead screw 22.

In its usual embodiment the inventive drive mechanism 10 rides on bearing shafts 24 and 26 as it is positioned in the "Y" direction. Also, in cooperation with the inventive structure 10 is a cutting head 28, a cutting tool 30 and a flexible drive shaft 32.

Figure 2:
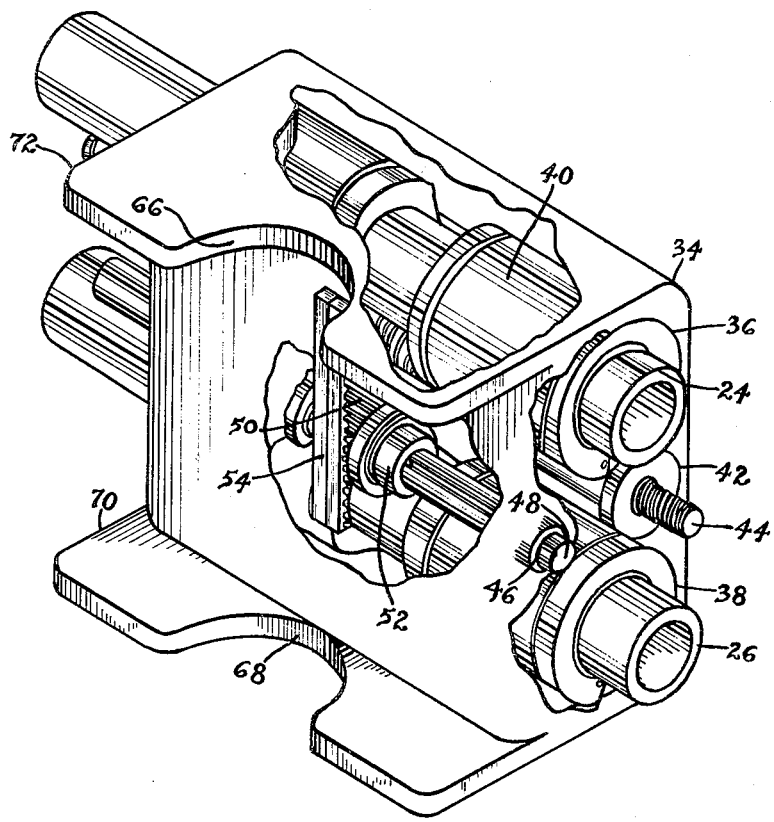
FIGURE 2 is cutaway of the inventive structure and depicts the interior of said structure and FIGURE 3 is a cutaway of the actuator mechanism for the instant invention.

Referring now to FIGURE 2, the drive mechanism 10 is shown being provided with a housing 34. The housing 34 is further provided with longitudinal openings 36 and 38 which allow passage of the bearing shafts 24 and 26 respectively through it. Retained in the housing are the ball bushings 40 which serve to allow easy movement of the drive mechanism 10 in the "Y" direction. An opening 42 is also provided in the housing 34 to provide for the "Y" lead screw 44. Another opening 46 supports a control spline 48. All of the aforesaid openings 36, 38, 42 and 46 have opposing openings on the other side of the housing 34. The control spline 48 has mounted thereon gearing 50. The gearing 50 is prevented from being longitudinally displaced by the ball spline nuts 52. Positionably mounted in a slot (not shown) in the housing 34 on the housing's exterior, but in engagement with the gearing 50, is the rack 54. The rack 54 is in direct engagement with the cutting head 28 which is positionably mounted on the bearing shafts 56.

Figure 3:
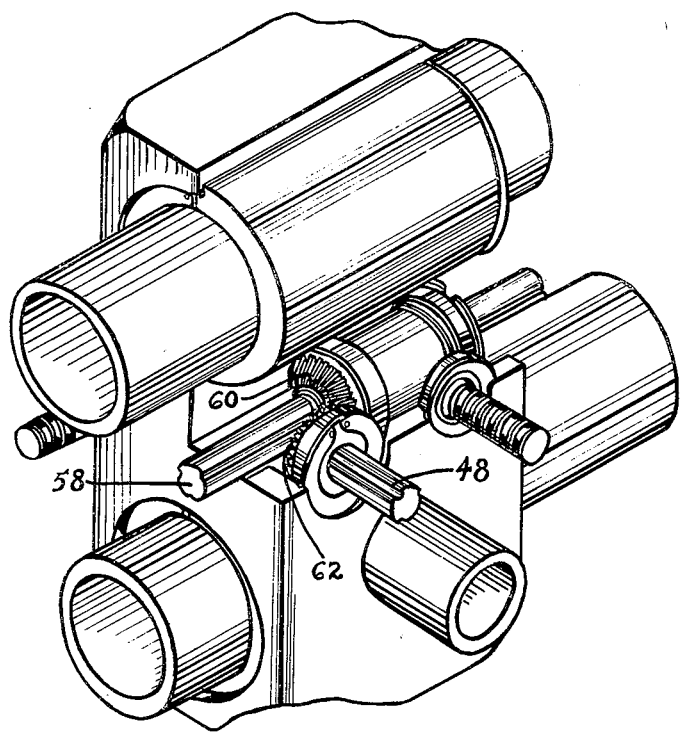

Referring now to FIGURE 3 the control spline 48 is shown in engagement with and driven by actuator spline 58. The driving motion is transferred through the beveled gears 60 and 62. Beveled gear 60 is mounted on the actuator spline 58 and beveled gear 62 is mounted on the control spline 48. The motor 64, FIGURE 1, operates to drive the actuator spline 58.

In the preferred form of the invention, the housing 34 is cutout in a circular fashion as shown at 66 and 68. These cutouts are on extensions 70 and 72 of the housing 34.

In operation the inventive structure 10 is positioned in an "X" direction by the operation of motor 14 driving the lead screw 16. The inventive structure 10 is positioned in a "Y" direction by the operation of motor 20 and the lead screw 22 driven by a linkage (not shown). When being positioned in the "Y" direction the inventive structure 10 rides on the bearing shafts 24 and 26 which also prevent the inventive structure from rotating in a plane parallel to the "X" axis. Positioning in the "Y" direction is facilitated by the low friction of the ball bushings 40. Once in the desired position the drive mechanism is then motivated to position in a "Z" direction. Such positioning is accomplished by the operation of motor 64 driving the actuator spline 58. As actuator spline 58 rotates, the beveled gears 60 fixedly mounted on it, operate to rotate the beveled gearing 62 and the spline control 48 which has the beveled gearing 62 mouted on it. The control spline 48 then rotates the gearing 50 mounted on it. As a result of rotating gear 50 the rack 54 is positioned in a vertical direction and thus places the cutting tool 30 in a desired position. Bearing shafts 56 have been provided on each side of the housing 39 and prevent wobbling of the cutting head 28 as the rack, to which it is attached, is moved in a vertical direction.

Obviously many modifications and variations of the present invention are possible in the light of the above teachings. It is therefore to be understood that within the scope of the appended claim the invention may be practiced otherwise than as specifically described.

I claim:

A drive mechanism movable on a coordinate positioning device comprising first, second, third and fourth support means, first bearing shaft means mounted between said first and second support means, a second bearing shaft rigidly mounted between said third and fourth support means, a first carriage slidably mounted on said first bearing shaft means, a second carriage slidably mounted on said second bearing shaft means, a third bearing shaft means rigidly mounted between said first and second carriages, a housing slidably mounted on said third bearing shaft means, a drive means mounted on said first stationary support means, a first bevel gear means contained in said first carriage mounted slidably on the shaft of said drive means, a shaft means fixedly attached to said bevel gear means and rotatably mounted on said first and second carriage means and said housing, a gear means contained in said housing means and mounted on said shaft means and a gear rack meshed with said gear means.

References Cited in the file of this patent

UNITED STATES PATENTS

| | | |
|---|---|---|
| 2,384,809 | Bullard et al. | Sept. 18, 1945 |
| 2,393,696 | Kraut et al. | Jan. 29, 1946 |
| 2,849,927 | Daugherty et al. | Sept. 2, 1958 |
| 2,858,978 | Yetter | Nov. 4, 1958 |
| 2,902,607 | Hedger et al. | Sept. 1, 1959 |